May 8, 1928.
A. C. MENNINGEN
TUMBLER
Original Filed Jan. 23, 1923
1,668,778
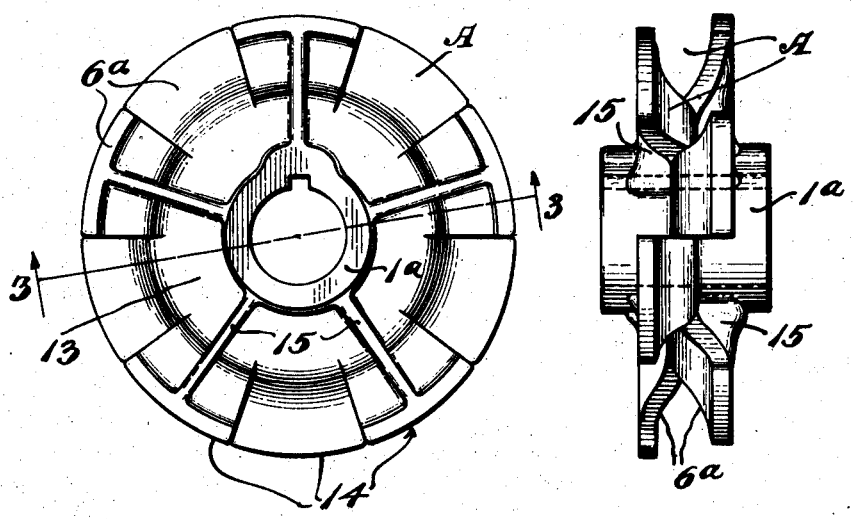
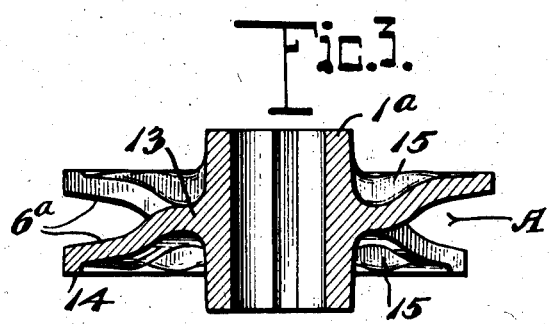
Inventor
A. C. Menningen Patented May 8, 1928.

1,668,778

UNITED STATES PATENT OFFICE.

ADOLPH C. MENNINGEN, OF MILWAUKEE, WISCONSIN, ASSIGNOR TO KOEHRING COMPANY, OF MILWAUKEE, WISCONSIN, A CORPORATION OF WISCONSIN.

TUMBLER.

Original application filed January 23, 1923, Serial No. 614,372. Divided and this application filed August 8, 1925. Serial No. 49,157.

This application constitutes a division of my pending application for patent, Serial Number 614,372, filed January 23, 1923, covering improvements in tumbler. Tumblers of the class of this invention are commonly used for the purpose of supporting or driving, either or both, the endless traction belt or tread of track laying tractors.

It is obvious that endless belts or treads, above referred to, are frequently operated in soft or mushy ground so that considerable mud and foreign matter engages with the tread in the use of the machine of which the tread forms traction equipment. There is considerable tendency of dirt, mud or foreign matter to accumulate between the traction tread shoes or leaks and the tumbler or sprocket member about which the same operate, and it is a special object of this invention to devise a construction of tumbler which may be termed self cleaning. In other words, in the operation of the tumbler cooperating with the traction belt parts, the interengaging portions of the tumbler are cleaned as the traction belt turns around the tumbler. The tumbler embodies peculiarly formed lug recesses enabling the foreign matter lodging thereon to readily pass off therefrom either by gravitation or by being forcibly ejected from the recesses as the lugs on the traction shoes enter said recess.

A full understanding will be had on reference to the accompanying drawings, with this description, and in the drawings:

Figure 1 is a side elevation view of a tumbler embodying the invention.

Figure 2 is an edge view of the same.

Figure 3 is a sectional view taken about on the line 3—3 of Figure 1.

Describing the tumbler device of this invention specifically and referring particularly to the drawing, the hub of the tumbler is designated 1ª. By means of the hub, the tumbler is adapted to be readily mounted upon and keyed to a tumbler shaft.

The body of the tumbler surrounding the hub comprises largely a web 13, the outermost portions of which are divided into sections which are deflected laterally in opposite directions to provide sprocket recesses A. The laterally deflected portions of said web extend radially in relation to the hub and provide side walls 6ª for the said recesses. Practically speaking the side walls 6ª of the recesses A form continuations of the web 13 being integral extensions thereof, and as previously suggested, said side walls are deflected alternately in the same direction, adjacent of said side walls extending in opposite directions.

The outer edges of the side walls 6ª are stiffened by the ribs 14, and the body portions of each side wall are reinforced or stiffened by radial ribs 15 which extend from the hub 1ª to the outer edge of each side wall 6ª, merging into the ribs 14 previously referred to.

Obviously, the lugs recesses A have open outer ends and are each open at one side. Moreover, there are no end walls for the lug recesses so that mud or foreign matter may be dislodged sidewise, of the recess, radially thereof, and endwise, as well. The construction of the whole tumbler is rendered very strong and rigid by the reinforcing ribs and the formation of the recesses A in the manner described is conducive to ready dislodgement of mud, dirt and foreign matter which may be picked up by the tread means which operates around the tumbler.

Having thus described my invention, what I claim as new and desire to cover by Letters Patent is:—

1. A tumbler wheel for traction devices comprising a hub and radially extending complemental sections, said sections being offset oppositely from a common plane at the hub so that their corresponding inner faces define reverse curves and their edge portions provide engaging elements for the teeth of an endless traction belt, said sections thereby forming an annular groove about the hub having only side faces.

2. A tumbler wheel for traction devices comprising a hub and radially extending sections alternately and correspondingly offset so that the peripheral portion of the sections are disposed in spaced parallel planes to thereby form an annular groove, the radial edge of each section being disposed in a plane contiguous to the adjacent edge of the next section, and the said edge portions provide engaging elements for the teeth of an endless traction belt.

3. A tumbler wheel for traction devices comprising a hub and a body portion of disk-like form having radially extending complemental sections, said sections being offset from the body adjacent the hub so that their corresponding inner faces define reverse curves whereby to form an annular groove about the hub, each section having a reinforcing rib extending outwardly from the hub in the plane of the peripheral portion of the extension.

4. A tumbler wheel comprising a hub and a disk-like body having a series of circumferentially arranged complemental sections alternately and correspondingly offset so that the peripheral portion of the opposing sections are disposed in spaced parallel planes to thereby provide an annular groove, the face of each section forming the basal portion of the groove presenting a laterally inclined surface whereby dirt tending to adhere is freely displaced laterally of the section, and the edge portions provide engaging elements for the teeth of an endless traction belt.

5. In a wheel for traction belts, a hub portion, two series of spaced sections arranged in a circular manner and in spaced planes, whereby to provide therebetween a peripheral groove to receive teeth of a traction belt, the sections of each series being spaced and inclined inwardly and laterally from the outermost portion of the groove, the sections of the two series being staggered so that adjacent sections extend in opposite directions and thus provide discharge passages which lead inwardly and laterally from the groove throughout its circumference to the side of the wheel.

6. In a wheel for traction belts, a hub portion, two series of spaced tapered sections arranged in a circular manner whereby they provide therebetween a peripheral groove to receive teeth of a traction belt, the sections of each series being spaced and curved inwardly and laterally from the outermost portion of the groove, the sections of the two series being staggered so that the adjacent sections extend in the opposite directions and thus provide discharge passages which lead inwardly and laterally from the groove throughout its circumference to the side of the wheel.

In testimony whereof I affix my signature.

ADOLPH C. MENNINGEN.